United States Patent
Liu et al.

(10) Patent No.: US 9,403,284 B2
(45) Date of Patent: Aug. 2, 2016

(54) RIP FENCE MECHANISM FOR SAWING MACHINE

(75) Inventors: Chia-Sheng Liu, Taichung County (TW); Fang-Cheng Hsiao, Taichung (TW)

(73) Assignee: DURO MACHINERY CORP., Taichung (TW)

(*) Notice: Subject to any disclaimer, the term of this patent is extended or adjusted under 35 U.S.C. 154(b) by 1465 days.

(21) Appl. No.: 12/776,062

(22) Filed: May 7, 2010

(65) Prior Publication Data
US 2011/0197733 A1    Aug. 18, 2011

(30) Foreign Application Priority Data
Feb. 12, 2010   (TW) .............................. 99104789 A (51) Int. Cl.
| B27B 27/02 | (2006.01) |
| B27B 27/10 | (2006.01) |
| B23Q 3/00 | (2006.01) |

(52) U.S. Cl.
CPC ................ B27B 27/02 (2013.01); B23Q 3/005 (2013.01); B27B 27/10 (2013.01); *Y10T 83/727* (2015.04); *Y10T 83/7607* (2015.04); *Y10T 83/7613* (2015.04)

(58) Field of Classification Search
CPC ........ B27B 27/02; B27B 27/10; B27B 27/04; B27B 27/06; B27B 27/08; B23Q 3/005; B23Q 3/3007; Y10T 83/727; Y10T 83/739; Y10T 83/7607; Y10T 83/7613
USPC .................. 83/438, 444, 468.2, 468.5, 468.6, 83/468.7, 468.1, 477.2; 144/287, 253.1, 144/253.5, 253.8; 269/318; 239/315
See application file for complete search history.

(56) References Cited

U.S. PATENT DOCUMENTS

| | | | | |
|---|---|---|---|---|
| 255,302 A * | 3/1882 | Luther | .................... | B27B 27/02 83/438 |
| 264,421 A * | 9/1882 | Sweet | .................... | B27B 27/02 83/438 |
| 381,752 A * | 4/1888 | Beach | .................... | B27B 27/02 144/253.8 |
| 453,893 A * | 6/1891 | Smith | .................... | B27B 27/02 83/438 |
| 1,113,153 A * | 10/1914 | Clement | .................. | B27B 27/02 144/253.1 |
| 1,789,125 A * | 1/1931 | Wilderson | .............. | B27B 25/10 83/438 |
| 2,273,715 A * | 2/1942 | Lonskey et al. | .......... | B23Q 1/26 144/253.1 |
| 2,786,497 A * | 3/1957 | Brucker | ......................... | 83/438 |
| 4,516,612 A * | 5/1985 | Wiley | ............................ | 144/1.1 |
| 4,593,590 A * | 6/1986 | Gray | ....................... | B27B 27/10 83/438 |
| 4,782,871 A * | 11/1988 | Aigner | .................... | B23Q 3/005 144/117.1 |
| 4,875,399 A * | 10/1989 | Scott et al. | ........... | B23D 45/044 83/468.3 |
| 4,964,450 A * | 10/1990 | Hughes et al. | ................. | 144/287 |
| 5,722,308 A * | 3/1998 | Ceroll et al. | ........... | B23Q 3/007 144/253.1 |

(Continued)

*Primary Examiner* — Clark F Dexter
(74) *Attorney, Agent, or Firm* — Browdy and Neimark, PLLC (57) ABSTRACT

A rip fence mechanism for being slidably connected to a worktable of a sawing machine includes parallel and spacedly arranged first and second rails, a fence plate pivotally connected between the first rail and the second rail in a way that the fence plate is pivotable between a vertical posture and a horizontal posture, and a support plate pivotally connected with the fence plate in a way that the support plate is pivotable between a first position where the support plate is abutted with the fence plate and a second position where the support plate is vertical to the fence plate. As a result, the lateral side of a to-be-cut workpiece can be directly stopped at the fence plate at the vertical posture and a bottom of the workpiece can be supported by the support plate at the second position during cutting.

4 Claims, 7 Drawing Sheets

(56) References Cited

U.S. PATENT DOCUMENTS

| | | | |
|---|---|---|---|
| 6,250,349 B1* | 6/2001 | Crofutt | B23Q 3/005 144/253.5 |
| 7,127,976 B1* | 10/2006 | Fitzsimmons | 83/435.11 |
| 2003/0159759 A1* | 8/2003 | Lima et al. | 144/287 |
| 2005/0217446 A1* | 10/2005 | Brazell et al. | 83/477.2 |

\* cited by examiner

RIP FENCE MECHANISM FOR SAWING MACHINE

BACKGROUND OF THE INVENTION

1. Field of the Invention

The present invention relates generally to a rip fence for a sawing machine such as a table saw, and more specifically to a rip fence mechanism for a sawing machine, which can stably support the workpiece under cutting.

2. Description of the Related Art

A conventional table saw is generally equipped with a rip fence for stopping at a lateral side of a workpiece under cutting so as to determine and restrict the cutting width of the workpiece. By means of the cooperation of rails with channels, the rip fence is slidably moveable relative to the worktable; further, the rip fence can be locked in any position by using a locking device clamping on a lateral side of the worktable or on the rail. If a to-be-cut workpiece has a width greater than that of an effective support zone of the worktable, the rip fence will need to be pulled outwardly away from the worktable to a proper distance for enabling the rip fence to be stoppable at the lateral side of the workpiece so as to determine the cutting width of the workpiece. Under this condition, a part of the workpiece will be suspended outside the worktable, such that the workpiece may not be firmly supported in the cutting process.

Another conventional table saw having a fixed primary worktable and an auxiliary table moveably connected with the primary worktable is now commercially available. In this design, the rip fence is constructed to be moveable along and positionable on the primary worktable or the auxiliary table. When a small-sized workpiece is to be cut, the rip fence can move along a direction toward or away from the saw blade to a desired position where the rip fence can properly stop at the lateral side of the workpiece, such that the cutting width of the workpiece can be determined. On the other hand, when a large-sized workpiece is to be cut, the auxiliary table will need to be pulled away from the primary worktable to a desired distance for extending the effective support width of the table saw and for enabling the rip fence that is set on the auxiliary table to be stoppable at the lateral side of the workpiece. This design can offer a better support effect to a large-sized workpiece during cutting. However, the structures and relationships among the primary worktable, the auxiliary table and the rip fence are much more complicated in design.

SUMMARY OF THE INVENTION

The present invention has been accomplished in view of the above-noted circumstances. It is therefore an objective of the present invention to provide a rip fence mechanism for a sawing machine, which can firmly support a large-sized workpiece and is simple in its structure.

Another objective of the present invention is to provide a rip fence mechanism for a sawing machine, which can be served as an auxiliary support for supporting the large-sized workpiece.

To attain the above-mentioned objectives, a rip fence mechanism, which is provided by the present invention and adapted to be slidably connected with a lateral side of a worktable of a sawing machine, comprises a first rail and a second rail, which are parallel to and spaced from each other, a fence plate pivotally connected between the first rail and the second rail in such a way that the fence plate is pivotable between a vertical posture and a horizontal posture, and a support plate pivotally connected with the fence plate in such a way that the support plate is pivotable between a first position where the support plate is abutted with the fence plate and a second position where the support plate is vertical to the fence plate. When the rip fence mechanism is pulled outwardly away from the lateral side of the worktable of the sawing machine, the lateral edge of the to-be-cut workpiece can be stopped at the fence plate at the vertical posture and the bottom of the workpiece can be supported by the support plate at the second position, such that the workpiece can be firmly supported in the cutting process. In addition, when the fence plate is rested at the horizontal posture, the rip fence mechanism of the present invention can be served as an auxiliary support mechanism to fully and firmly support a large-sized workpiece for cutting.

Preferably, the fence plate may comprise an elongated positioning groove extending along a longitudinal axis thereof, and the support plate may comprise a pivot shaft protruding outwardly from a rear surface thereof and pivotally inserted into the aforesaid elongated positioning groove.

Preferably, the elongated positioning groove of the fence plate may have a pivot portion and a guide portion, and the support plate may comprise an extension piece, which extends outwardly from the rear surface of the support plate and is provided at a free end thereof with a guide protrusion which is slidably received in the guide portion of the elongated positioning groove of the fence plate. The extension piece is further provided at a middle thereof with the above-mentioned pivot shaft which is pivotally inserted into the pivot portion of the elongated positioning groove of the fence plate.

Preferably, a pivot device may be provided in between the first rail and a first end of the fence plate and/or the second rail and a second end of the fence plate. The pivot device may comprise a mount provided with a shaft hole and a curved guide slot, a pivot shaft fixed to the fence plate and pivotally inserted into the shaft hole of the mount, a guide rod connected to the fence plate and passing through the curved guide slot of the mount, and a retaining member connected with the guide rod and stoppable against the mount so as to position the guide rod in the curved guide slot.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
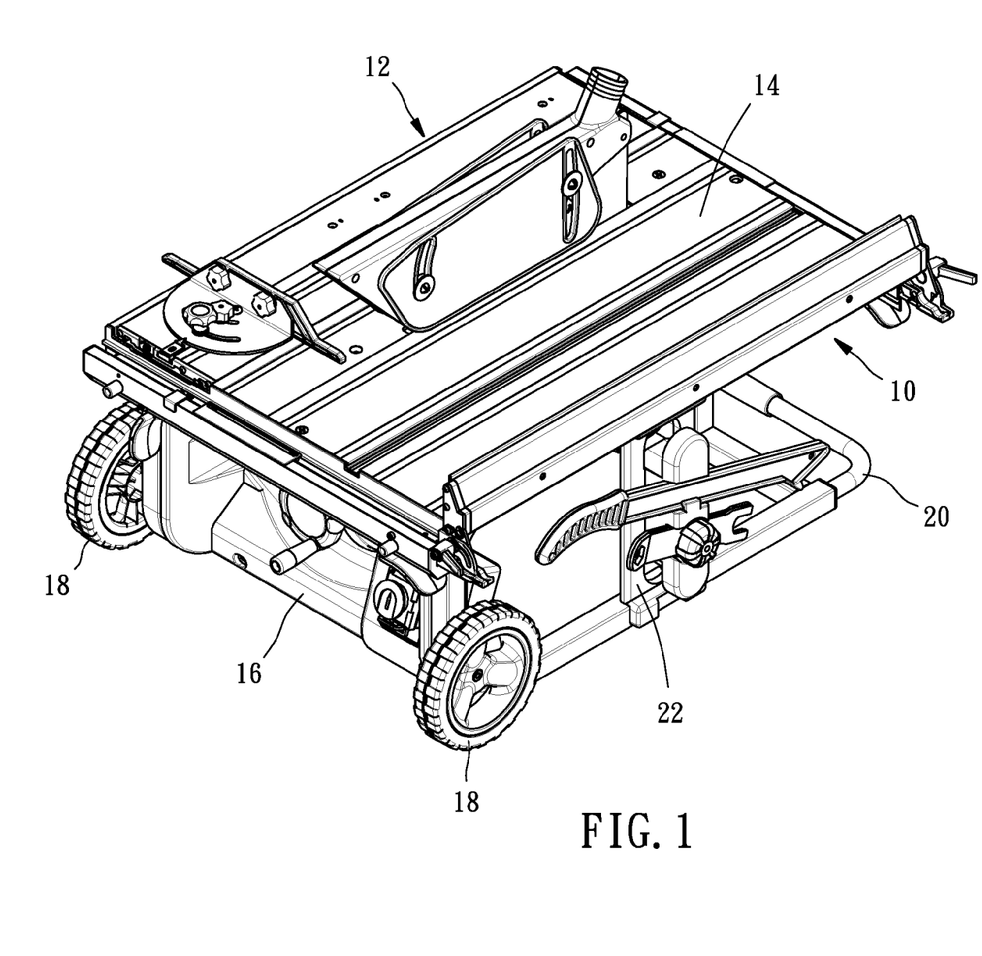
FIG. 1 is a perspective view of a table saw in which a rip fence mechanism according to a preferred embodiment of the present invention is installed.
Figure 2:
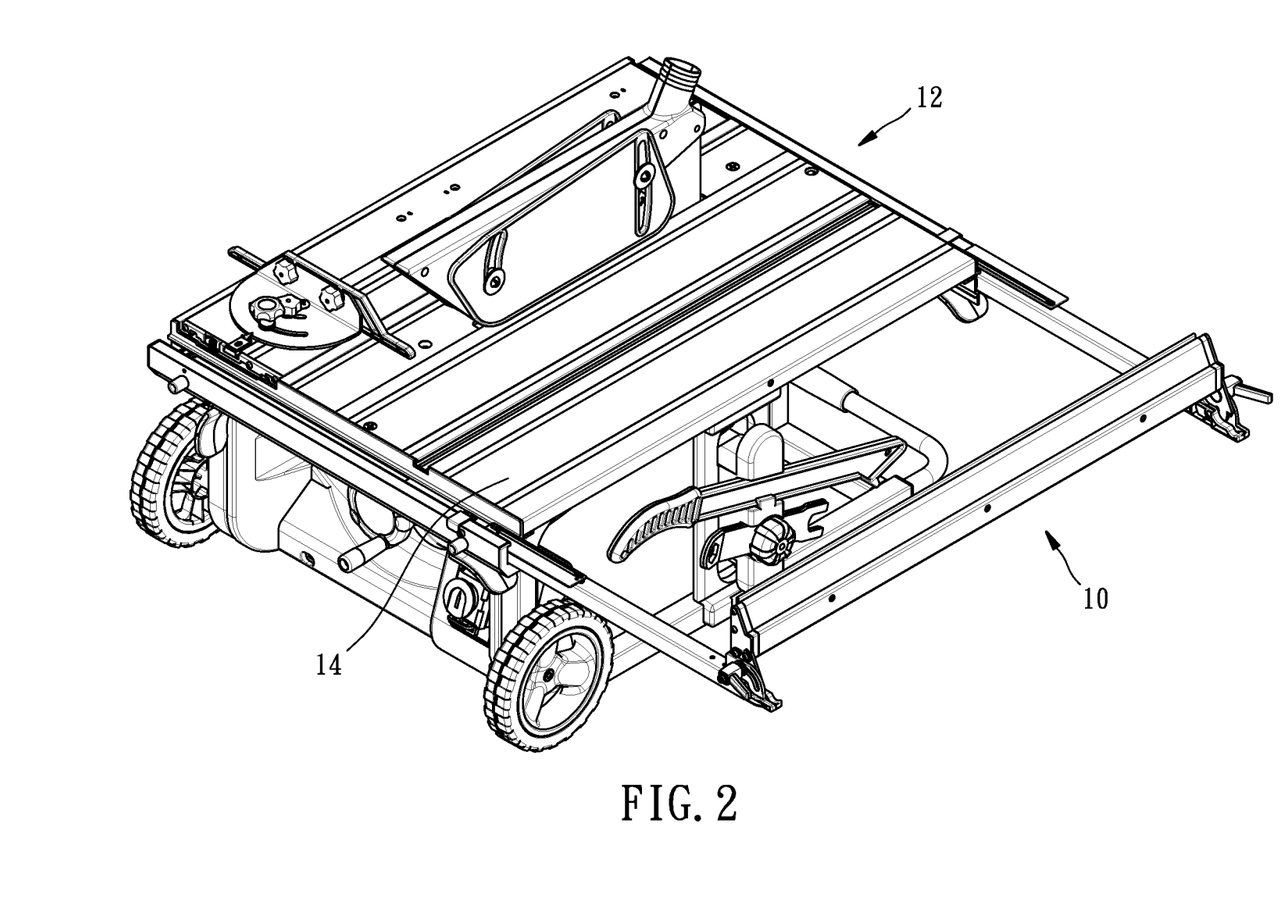
FIG. 2 is another perspective view of the table saw, showing that the rip fence mechanism is drawn apart from a lateral side of a worktable of the table saw.

As shown in FIGS. 1-2, the rip fence mechanism, provided by a preferred embodiment of the present invention and denoted by numeral reference 10, is adapted to be slidably connected with a worktable 14 of a table saw 12. In this embodiment, the table saw 12 includes a base seat 16, two wheels 18 rotatably and respectively mounted to two corners of the front side of the base seat 16, a retractable handlebar 20 provided at the rear side of the base seat 16 for being held by a user to conveniently move the table saw 12, and a rack 22 at a lateral side of the base seat 16 for holding processing tools, accessories or the like. It will be appreciated that the rip fence mechanism 10 of the present invention can be used in cooperation with any kind of sawing machine, not limited to the table saw 12 as shown in FIGS. 1 and 2.

As shown in FIG. 1, the rip fence mechanism 10 can be closely abutted with the lateral side of the worktable 14. If a to-be-cut workpiece (not shown in the drawings) has a width smaller than that of an effective support zone of the worktable 14, the rip fence mechanism 10 can slidably move towards the saw blade to stop against the lateral side of the workpiece so as to hold the workpiece in position for cutting. On the other hand, if the workpiece has a width exceeding the width of the effective support zone of the worktable 14, the rip fence mechanism 10 can be slidably pulled apart from the lateral side of the worktable 14 to a desired position, as shown in FIG. 2 for example, such that the lateral side of the workpiece can also be stopped at the rip fence mechanism 10 so as to be held in position for cutting.

Figure 3:
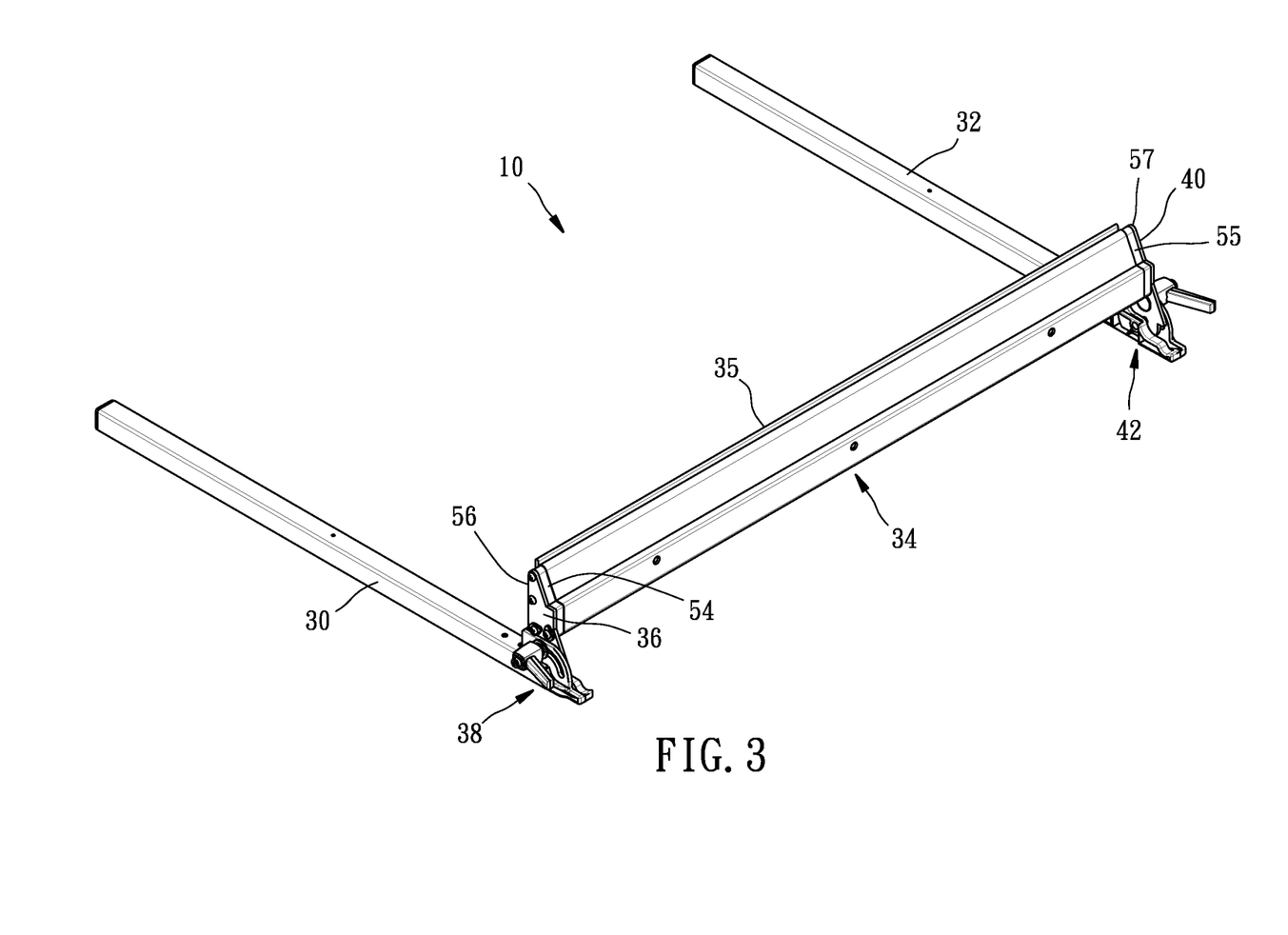
FIG. 3 is a perspective view of the rip fence mechanism according to the preferred embodiment of the present invention.
Figure 4:
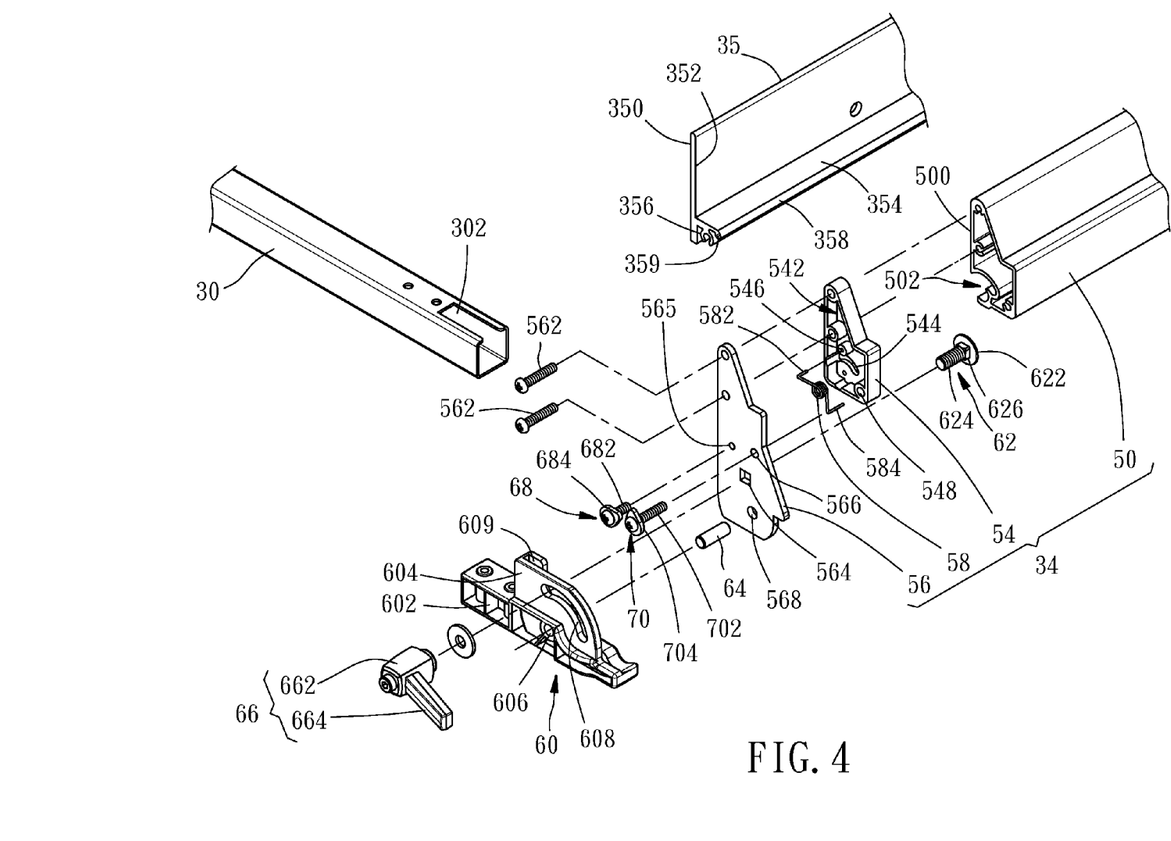
FIG. 4 is an exploded view of parts of the rip fence mechanism according to the preferred embodiment of the present invention.
Figure 5:
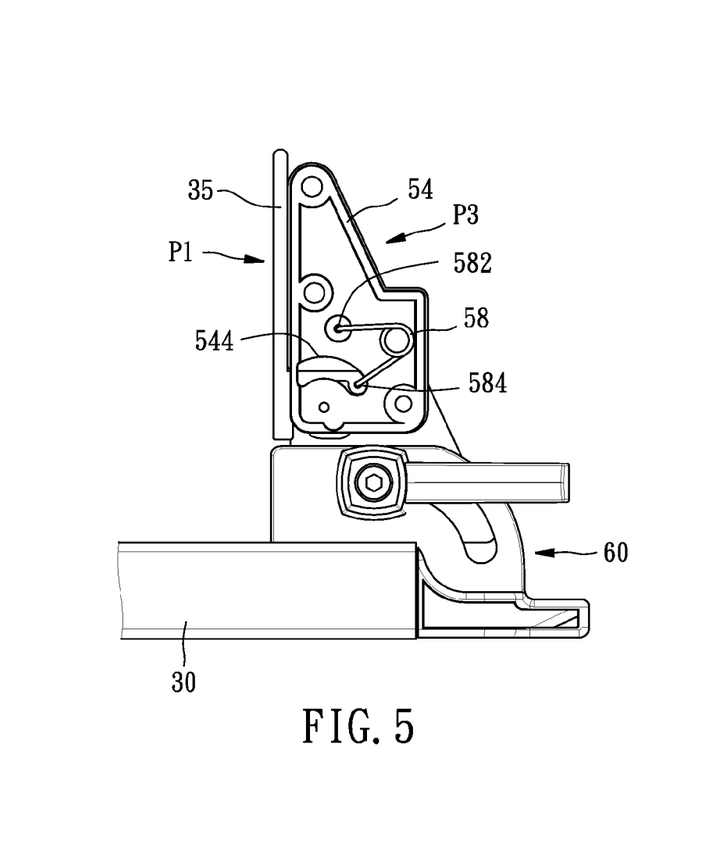
FIG. 5 is a left side view of the rip fence mechanism of the present invention, showing that a fence plate is rested at a vertical posture and a support plate is rested at a first position, in which an end cap of the fence plate is removed for illustrative purpose.
Figure 6:
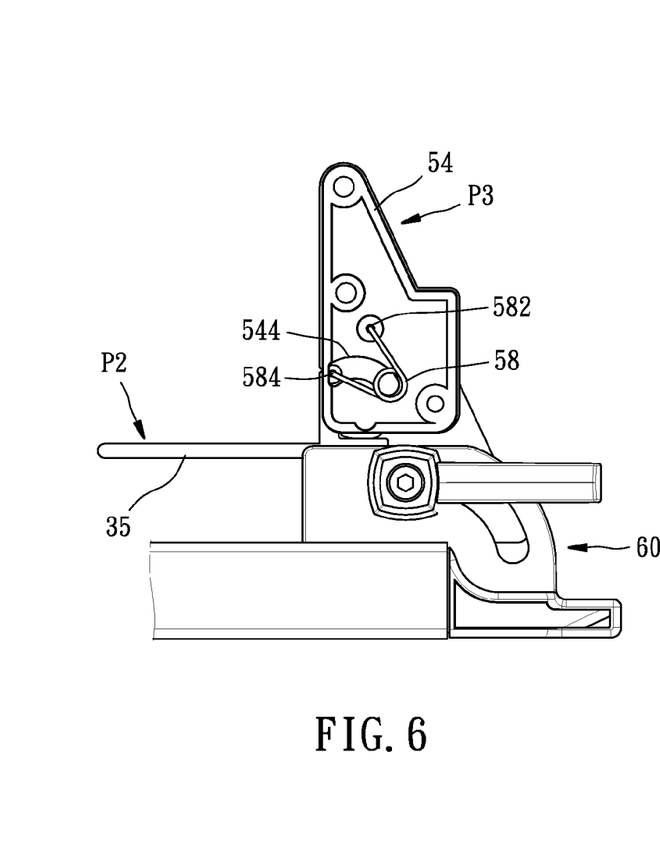
FIG. 6 is similar to FIG. 5, but showing that the fence plate is rested at the vertical posture and the support plate is rested at a second position.

As shown in FIGS. 3-4, the rip fence mechanism 10 provided by a preferred embodiment of the present invention comprises parallel and spacedly arranged first and second rails 30 and 32, a fence plate 34, a support plate 35, a first pivot device 38 set between the first rail 30 and a first end 36 of the fence plate 34, a second pivot device 42 set between the second rail 32 and a second end 40 of the fence plate 34. Since the structures of the first and second rails 30 and 32 are the same and the structures of the first and second pivot devices 38 and 42 are symmetric, only the features and relationships of the first rail 30, the fence plate 34, the support plate 35 and the first pivot device 38 will be detailedly described hereinunder for concise illustration of the present invention. By reference to the following detailed description, a person having ordinary skill in the related art can fully understand the whole features, structures and operation of the rip fence mechanism 10 of the present invention.

The first rail 30 is formed of a hollow rectangular tube, having an end adapted for being slidably inserted into a side of the worktable 14 of the table saw 12, and the other end provided with a positioning notch 302.

The fence plate 34 includes a plate body 50, a first end seat 54 mounted to a first end face 500 of the plate body 50, a second end seat 55 mounted to a second end face of the plate body 50, which is opposite to the first end face 500 but not shown in the drawings, a first end cap 56 mounted to the first end seat 54, a second end cap 57 mounted to the second end seat 55, a first spring member 58 set between the first end seat 54 and the first end cap 56, and a second spring member (not shown in the drawings) set between the second end seat 55 and the second end cap 57. Similarly, since the features and relationships of the first end face 500 of the plate body 50, the first end seat 54, the first end cap 56 and the first spring member 58 are either the same as or symmetric to those of the second end face of the plate body 50, the second end seat 55, the second end cap 57 and the second spring member respectively, only the former, first element set will be detailedly illustrated hereinafter for concise illustrative purpose.

Figure 7:
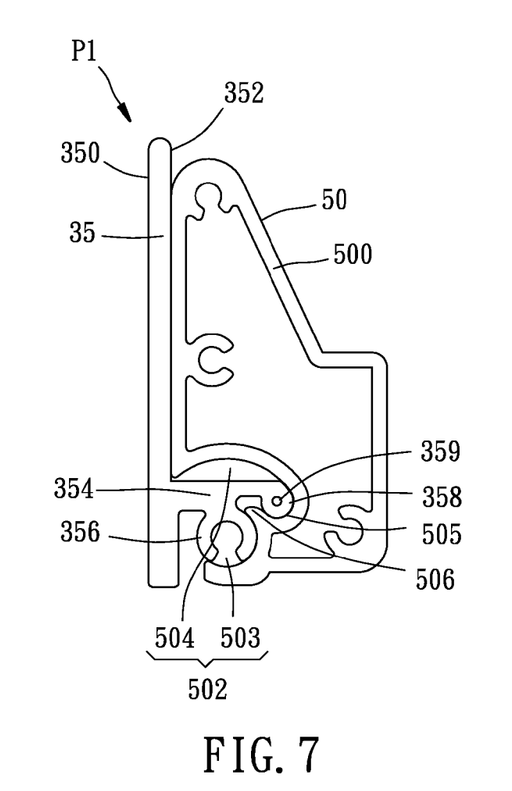
FIG. 7 is a left side view showing that the support plate is rested at the first position.
Figure 8:
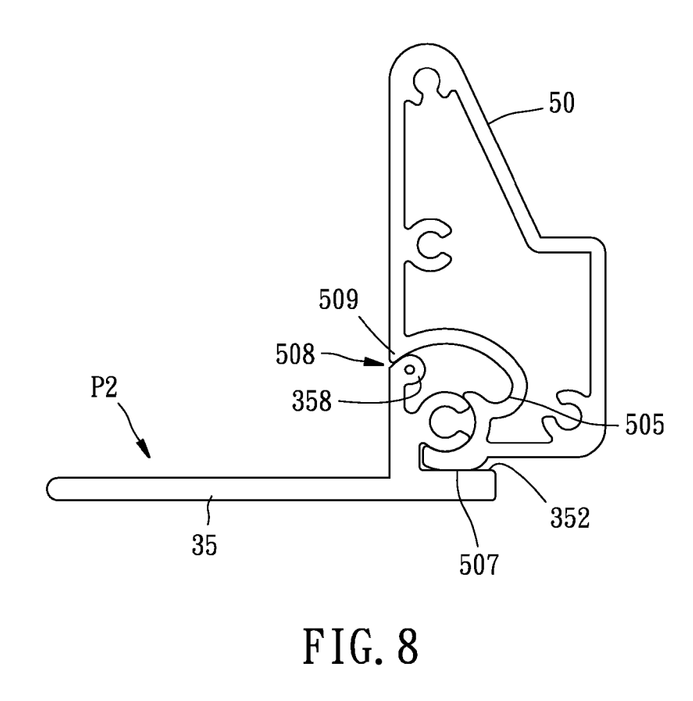
FIG. 8 is similar to FIG. 7 but showing that the support plate is rested at the second position.

The plate body 50 is an aluminum-extruded element, having an elongated positioning groove 502 extending from the first end face 500 to the second end face along a longitudinal axis of the plate body 50. Referring to FIGS. 7 and 8, the positioning groove 502 is defined having a pivot portion 503 and a curved guide portion 504.

The first end seat 54 is mounted to the first end face 500 of the plate body 50 and provided with a recessed receiving space 542, a curved through hole 544 corresponding in location to the curved guide portion 504 of the plate body 50, an insertion hole 546 above the curved through hole 544, and a shaft hole 548 at a corner thereof.

By means of the screws 562 which pass through the first end cap 56 and the first end seat 54 and are screwingly threaded into the plate body 50, the first end cap 56 covers the first end seat 54 to seal the receiving space 542, such that the outer surface of the first end cap 56 forms the first end 36 of the fence plate 34. The first end cap 56 has a rectangular through hole 564 communicated with the receiving space 542, first and second threaded holes 565 and 566 above the rectangular through hole 564, and a shaft hole 568 corresponding to a shaft hole 606 of a mount 60.

The first spring member 58, which is realized by a torsion spring in this preferred embodiment, is received in the receiving space 542 of the first end seat 54. A first arm 582 of the spring member 58 is fixedly inserted into the insertion hole 546 of the first end seat 54. A second arm 584 of the spring member 58 passes through the curved through hole 544 of the first end seat 54 and is inserted into a predetermined portion of the support plate 35.

The support plate 35 is also an aluminum-extruded element, having a flat front surface 350, a rear surface 352, and an extension piece 354 vertically and outwardly extending from the aforesaid rear surface 352. A pivot shaft 356 vertically and outwardly extends from a middle of the extension piece 354. The free end of the extension piece 354 is formed with a guide protrusion 358 having an insertion hole 359 into which the second arm 584 of the first spring member 58 is fixedly inserted. By means of slidably inserting the extension piece 354 into the positioning groove 502 from the first end face 500 of the plate body 50 along the longitudinal axis of the plate body 50, the support plate 35 is pivotally connected with plate body 50 of the fence plate 34. It can be seen from FIGS. 7 and 8 that the pivot shaft 356 of the support plate 35 is pivotally received in the pivot portion 503 of the positioning groove 502, and the guide protrusion 358 is slidably and curvedly moveable in the guide portion 504 of the positioning groove 502, such that the support plate 35 is pivotable relative to the fence plate 34 between a first position P1 where the support plate 35 is abutted with the plate body 50 of the fence plate 34, as shown in FIG. 7, and a second position P2 where the support plate 35 is vertical (i.e., orthogonal) to the plate body 50 of the fence plate 34, as shown in FIG. 8.

When the support plate 35 is moved to the first position P1, as shown in FIG. 7, the guide protrusion 358 is located at a closed end 505 of the guide portion 504 of the positioning groove 502 and stopped at an end edge 506 of the closed end 505, such that the support plate 35 can be held at the first position P1. On the other hand, when the support plate 35 is moved to the second position P2, as shown in FIG. 8, the rear surface 352 of the support plate 35 is stopped at a bottom 507 of the plate body 50 of the fence plate 34 and the guide protrusion 358 of the support plate 35 is stopped at an end edge 509 of an open end 508 of the guide portion 504 of the positioning groove 502 of the plate body 50 of the fence plate 34, such that the support plate 35 can be retained at the second position P2.

Referring to FIGS. 3-4 and 9-10, the first pivot device 38 comprises the mount 60, a guide rod 62, a pivot shaft 64, a retaining member 66, a first adjustment member 68, and a second adjustment member 70.

The mount 60 includes a base 602 and a plate 604 extending upwardly from the base 602. An end of the base 602 of the mount 60 is inserted into the positioning notch 302 of the first rail 30 and fastened to the first rail 30 by screws (not shown in the drawings). The base 602 is provided at a middle thereof with a shaft hole 606. The plate 604 has a curved guide slot 608 shaped like a quarter arc, and an end which is bent in shape to form a restriction portion 609.

The guide rod 62 of the first pivot device 38 has a head 622, a threaded body 624 passing through the curved guide slot 608 and being screwingly threaded into the retaining member 66, and a rectangular neck 626, which is provided between the head 622 and the threaded shank 624 and inserted into the rectangular through hole 564 of the first end cap 56.

Figure 9:
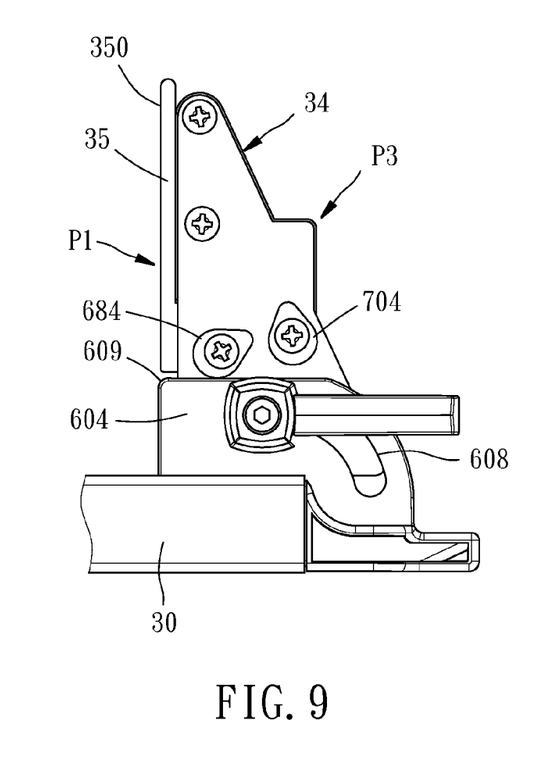
FIG. 9 is a left side view of the rip fence mechanism of the present invention, showing that the fence plate is rested at the vertical posture and the support plate is rested at the first position.
Figure 10:
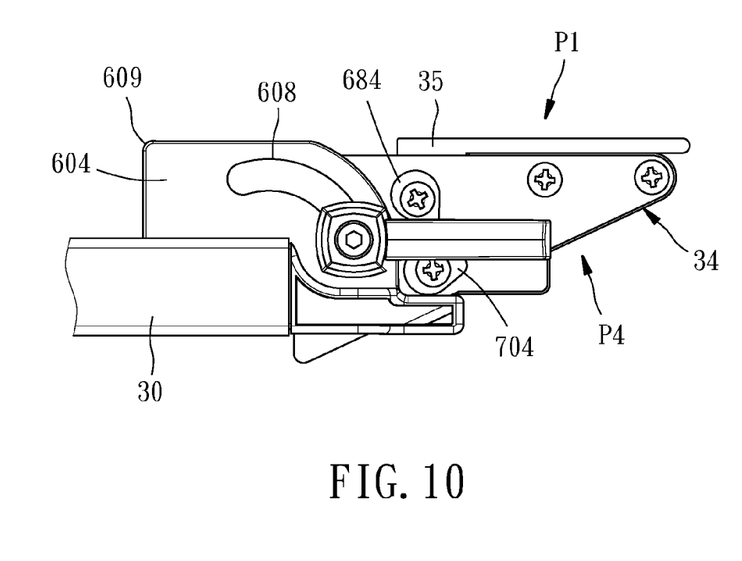
FIG. 10 is another left side view of the rip fence mechanism of the present invention, showing that the fence plate is rested at the horizontal posture and the support plate is rested at the first position.

The pivot shaft 64 has an end inserted into the shaft hole 568 of the first end cap 56, and the other end pivotally inserted in the shaft hole 606 of the mount 60. By this way, the fence plate 34 can be turned about the pivot shaft 64 and along the path of the curved guide slot 608 between a vertical posture P3, as shown in FIG. 9, and a horizontal posture P4, as shown in FIG. 10, relative to the mount 60. When the fence plate 34 is stayed at the vertical posture P3, the restriction portion 609 can be served as a limiter stopping at a front side of the first end cap 56 of the fence plate 34 so as to prevent an exceeding angle offset of the fence plate 34 from the true vertical posture.

The retaining member 66 has a nut 662 engaged with the threaded body 624 of the guide rod 62, and a handle 664 extending outwardly from the nut 662. When the nut is tightened, the inner end face of the nut 662 will firmly stop against the plate 604 of the mount 60 so as to lock the guide rod 62 in the curved guide slot 608. That is, the fence plate 34 is locked and stationary relative to the mount 60.

The first adjustment member 68 has a shank 682 screwingly threaded into the first threaded hole 565 of the first end cap 56, and a cam 684 provided at an end of the shank 682. If the fence plate 34 is rested at a vertical dead point but the fence plate 34 is, at this state, not located at the true vertical posture that is normal to the horizontal, the fence plate 34 can be fine adjusted to the true vertical posture by turning the cam 684 that is in contact, as shown in FIG. 9, with the plate 604 of the mount 60 to fine adjust an angle of the fence plate 34 at that state.

The second adjustment member 70 has a shank 702 screwingly threaded into the second threaded hole 566 of the first end cap 56, and a cam 704 provided at an end of the shank 702. If the fence plate 34 is rested at a horizontal dead point but at this state the fence plate 34 is not located at the true horizontal posture, the fence plate 34 can be fine adjusted to the true horizontal posture by turning the cam 704 that is in contact, as shown in FIG. 10, with the plate 604 of the mount 60 to fine adjust an angle of the fence plate 34 at that state.

When the fence plate 34 is rested at the vertical posture P3 and the support plate 35 is rested at the first position P1, as shown in FIG. 9, the lateral side of a to-be-cut workpiece can be directly stopped at the front surface 350 of the support plate 35 such that the cutting width of the workpiece can be determined. On the other hand, if a large-sized workpiece needs to be cut, the rip fence mechanism 10 of the present invention can be slidably and outwardly pulled apart from the worktable 14 to a desired distance, as shown in FIG. 2 for example, and the support plate 35 can be set to the second position P2 as shown in FIG. 8, such that the lateral side of the large-sized workpiece can be directly stopped at the fence plate 34 that is stayed at the vertical posture and the bottom of the workpiece can be supported by the support plate 35 that is stayed at the second position P2. In addition, the fence plate 34 can be set to the horizontal posture P4 and the support plate 35 can be maintained at the first position P1, as shown in FIG. 10, such that the bottom of a large-sized workpiece can be fully and firmly supported by the support plate 35 for facilitating the cutting of the large-sized workpiece. That is, the rip fence mechanism 10 of the present invention can be served as an auxiliary support in addition to the primary worktable of the sawing machine in a cutting process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rip fence mechanism for a sawing machine, comprising:
   a first rail and a second rail, which are parallel to and spaced from each other;
   a fence plate having a surface for abutting a workpiece, the fence plate pivotally connected at one end to the first rail and at a second end to the second rail in a way that the surface of the fence plate is pivotable about a pivot axis from a vertical posture to a horizontal posture, wherein the vertical posture and the horizontal posture are orthogonal with respect to one another, and
   a support plate having a front surface for abutting a workpiece, the support plate being pivotally connected with the fence plate in a way that the support plate is pivotable about a longitudinal axis between a first position, where the support plate is abutted with the fence plate such that the front surface of the support plate is substantially parallel to the fence plate surface, and a second position where the front surface of the support plate is orthogonal to the fence plate surface;
   wherein the fence plate comprises an elongated positioning groove extending along a length of the fence plate and defining said longitudinal axis of the fence plate, said longitudinal axis being substantially parallel to said pivot axis; and the support plate further comprises a rear surface and a pivot shaft protruding outwardly from the rear surface and pivotally inserted into the elongated positioning groove.

2. The rip fence mechanism as claimed in claim 1, wherein the elongated positioning groove of the fence plate has a pivot portion and a guide portion; the support plate comprises an extension piece, which extends outwardly from the rear surface of the support plate and is provided at a free end thereof with a guide protrusion, which is slidably received in the guide portion of the elongated positioning groove of the fence plate, and is provided at a middle thereof with said pivot shaft, which is pivotally inserted into the pivot portion of the elongated positioning groove of the fence plate.

3. The rip fence mechanism as claimed in claim 2, wherein when the support plate is located at the first position, the guide protrusion of the support plate is located at a closed end of the guide portion of the elongated positioning groove of the fence plate; when the support plate is located at the second position, the rear surface of the support plate is stopped at a bottom of the fence plate and the guide protrusion of the support plate is stopped at an end edge of an open end of the guide portion of the elongated positioning groove of the fence plate.

4. The rip fence mechanism as claimed in claim 3, wherein the fence plate comprises:

a plate body having a first end face, a second end face opposite to the first end face, and said elongated positioning groove extending through the first and second end faces;

a first end seat mounted to the first end face of the plate body and provided with a receiving space and a curved through hole;

a first end cap mounted to the first end seat and covering the receiving space of the first end seat, and a torsion spring received in the receiving space of the first end seat and provided with a first arm fixed to the first end seat, and a second arm passing through the curved through hole of the first end seat and being mounted to the support plate.

\* \* \* \* \*